US012680452B2

(12) United States Patent
Hu et al.

(10) Patent No.: US 12,680,452 B2
(45) Date of Patent: Jul. 14, 2026

(54) TUNNEL AUTOMATIC MONITORING AND MEASUREMENT EQUIPMENT AND METHOD BASED ON FIXED-POINT TOUR MEASUREMENT

(71) Applicant: Guizhou Transportation Planning Survey & Design Academe Co.LTD, Guiyang (CN)

(72) Inventors: Qiang Hu, Guiyang (CN); Bin Du, Guiyang (CN); Yicheng Wang, Guiyang (CN); Xiaoyong Liu, Guiyang (CN); Deming Gou, Guiyang (CN); Hong Yang, Guiyang (CN); Junwei Chun, Guiyang (CN); Mingfang Wu, Guiyang (CN); Mingjiang Dai, Guiyang (CN)

(73) Assignee: Guizhou Transportation Planning Survey & Design Academe Co.LTD, Guiyang (CN)

( * ) Notice: Subject to any disclaimer, the term of this patent is extended or adjusted under 35 U.S.C. 154(b) by 286 days.

(21) Appl. No.: 18/512,117

(22) Filed: Nov. 17, 2023

(65) Prior Publication Data

US 2024/0093608 A1      Mar. 21, 2024

Related U.S. Application Data

(63) Continuation of application No. PCT/CN2022/097614, filed on Jun. 8, 2022.

(30) Foreign Application Priority Data

Mar. 25, 2022    (CN) ......................... 202210302185.6

(51) Int. Cl.
    *E21F 17/18*      (2006.01)
    *G01B 11/00*      (2006.01)
    *G01B 11/26*      (2006.01)

(52) U.S. Cl.
    CPC ............ *E21F 17/18* (2013.01); *G01B 11/002* (2013.01); *G01B 11/26* (2013.01)

(58) Field of Classification Search
    CPC ........ E21F 17/18; G01B 11/002; G01B 11/26
    (Continued)

(56) References Cited

U.S. PATENT DOCUMENTS

2023/0386006 A1* 11/2023 Shi ......................... H04N 7/181

FOREIGN PATENT DOCUMENTS

| CN | 103791849 A | 5/2014 |
| CN | 107747910 A | 3/2018 |

(Continued)

*Primary Examiner* — Sunghee Y Gray
(74) *Attorney, Agent, or Firm* — WPAT, PC

(57) ABSTRACT

A tunnel automatic monitoring and measuring equipment and method based on fixed-point tour measurement are provided. The equipment includes a monitoring trolley that can move freely in the longitudinal direction of the tunnel, multiple automatic tracking and identification devices are set on the monitoring trolley, the automatic tracking and identification device is connected to the background processing system telecommunication; a monitoring points with reflective markings are arranged on the surface of the tunnel support structure, under the cooperation of the monitoring trolley and the automatic tracking and identification device, the reflective markings set on the tunnel support structure can be automatically measured at the fixed point to obtain the coordinate information of the relevant monitoring points; then, the deformation data of the support structure required in the construction process are extracted by coordinate information calculation.

8 Claims, 6 Drawing Sheets

(58) Field of Classification Search
USPC .......................................................... 356/601
See application file for complete search history.

(56)                          References Cited

FOREIGN PATENT DOCUMENTS

| CN | 109736895 | A |   | 5/2019 |                    |
|----|-----------|---|---|--------|--------------------|
| CN | 110346807 | A | * | 10/2019 | ............ G01S 17/87 |
| CN | 210603211 | U | * | 5/2020 |                    |
| CN | 111473734 | A |   | 7/2020 |                    |
| CN | 112461122 | A |   | 3/2021 |                    |
| JP | 2001066133 | A |   | 3/2001 |                    |
| JP | 2015083649 | A | * | 4/2015 |                    |
| KR | 101455936 | B1 | * | 10/2014 | ........... G01N 21/954 |

* cited by examiner

TUNNEL AUTOMATIC MONITORING AND MEASUREMENT EQUIPMENT AND METHOD BASED ON FIXED-POINT TOUR MEASUREMENT

CROSS REFERENCE TO THE RELATED APPLICATIONS

This application is a continuation application of International Application No. PCT/CN2022/097614, filed on Jun. 8, 2022, which is based upon and claims priority to Chinese Patent Application No. 202210302185.6, filed on Mar. 25, 2022, the entire contents of which are incorporated herein by reference.

TECHNICAL FIELD

The present invention relates to a tunnel automatic monitoring and measuring equipment and method based on fixed-point tour measurement, which belongs to the technical field of tunnel engineering construction.

BACKGROUND

As an important means of tunnel NATM construction, the importance of tunnel monitoring and measurement is self-evident. By dynamic monitoring of the deformation of the initial support via monitoring and measurement means, the mechanical relationship between the tunnel support structure and the surrounding rock can be scientifically understood, the stability of the initial support structure can be grasped, and the necessary technical data are provided for the dynamic design and information construction of the tunnel. It can be said that monitoring and measurement is a crucial technical means in the process of tunnel construction, and it is also an information weapon to ensure the safety of tunnel construction. At present, the tunnel monitoring and measurement work is generally carried out by manual use of a total station, level or convergence meter, and other measuring instruments, which can meet the relevant monitoring requirements in theory. However, due to the influence of human factors, there are inevitably some practical problems, such as excessive low monitoring frequency and easy distortion of monitoring data, which cannot effectively reflect the dynamic deformation of the support structure. Meanwhile, most of the analyses of existing monitoring data are still carried out by artificial organizations. Therefore, the results of monitoring and analysis are also disturbed by the interference of the human uncertain factors. In addition, when the initial support of the tunnel is seriously cracked and deformed, there is also a certain safety risk in dispatching surveyors into the tunnel to carry out deformation measurements.

It can be seen that there are some disadvantages that cannot be ignored in the manual form of monitoring and measurement. At present, the existing tunnel automatic monitoring and measurement system on the market has many problems, such as simple equipment function, expensive instrument cost, and low practicability, which leads to poor actual use effect. In view of the above considerations, it has become an urgent problem to be solved in the engineering field to study a tunnel automatic monitoring and measurement equipment and a method based on fixed-point tour measurement.

SUMMARY

In view of this, the purpose of the present invention is to provide a tunnel automatic monitoring and measurement equipment and method based on fixed-point tour measurement, which can overcome the shortcomings of existing technology.

The purpose of the present invention is realized through the following technical schemes:

A tunnel automatic monitoring and measuring equipment based on fixed-point tour measurement, including a monitoring trolley that can move freely in the longitudinal direction of a tunnel, multiple automatic tracking and identification devices are set on the monitoring trolley, the automatic tracking and identification device is connected to a background processing system telecommunication; a number of reflective markings are arranged on a surface of a tunnel support structure to mark a location of a monitoring point, the reflective markings form a monitoring section in the transverse direction of the tunnel and a monitoring line in the axial direction of the tunnel; each automatic tracking and identification device is relative to the corresponding monitoring line.

The aforementioned monitoring trolley includes an arch truss corresponding to a tunnel contour, a walking mechanism is set at a bottom of the arch truss, the automatic tracking and identification devices are arranged in a ring on a front side of the arch truss to realize a comprehensive detection of the tunnel contour in front of the monitoring trolley.

The aforementioned automatic tracking and identification device includes an intelligent scanning camera and a laser ray head, the automatic tracking and identification device is fixed on the arch truss by a fixed frame that can adjust the transverse and vertical deflection angles of the laser ray head.

The aforementioned fixed frame includes a connecting seat connected to a bar of the arch truss, a connecting plate arranged on the connecting seat, and a flat rotating turntable which is in a rotating connection on the connecting plate, a coordinate target is set on a back of the flat rotating turntable, a hinge seat is set on the front of the flat rotating turntable, the intelligent scanning camera and the laser ray head are on a hinged connection on the hinge seat through a vertical rotation shaft.

A tunnel automatic monitoring and measurement method based on fixed-point tour measurement, which includes the following steps:

s1. setting multiple sets of monitoring sections on the surface of the tunnel support structure, and setting multiple monitoring points on each set of monitoring sections, the longitudinal positions of adjacent monitoring points are in one-to-one correspondences so that the monitoring points on multiple monitoring sections constitute multiple monitoring lines;

s2. obtaining coordinate information of the relevant monitoring points at different time points through a tour monitoring method of the tunnel automatic monitoring and measuring equipment;

s3. extracting required initial support deformation data by calculating the coordinate information of specific monitoring points at different time points;

s4. formulating corresponding support structure deformation risk criteria, as well as corresponding early warning levels, and automatic emergency measures.

In step s1, setting at least five monitoring points on each monitoring section and arranging the monitoring points in a tunnel vault, and symmetrically arranging the monitoring points in the relative vault in an arch waist position and an arch foot position, so the monitoring points on multiple monitoring sections form five monitoring lines, and monitoring the vault, arch waist and arch foot of the tunnel respectively.

The aforementioned monitoring measurement method, in step s2, collecting a tunnel measurement coordinate system and an unit coordinate system of the monitoring points, the tunnel measurement coordinate system is consistent with a construction control network coordinate system of the project; the unit coordinate system of the monitoring point takes a tangent line direction of an on-line position of the monitoring point as a positive direction of the y-axis, and the vertical direction is the z-axis direction, and then determining the x-axis direction according to right-handed law;

setting the reflective marking on each monitoring point, using the automatic tracking and identification device with an intelligent scanning camera to realize the automatic intelligent tracking and recognition of reflective markings, then, collecting the unit coordinate information of the relevant monitoring points by a laser point measurement, including a longitudinal deflection angle, a transverse deflection angle, a laser ray length, a monitoring time point, automatic tracking and identification device displacement coordinates and tour monitoring number information of laser ray in monitoring work.

The aforementioned monitoring and measurement method, coordinate data collection and calculation steps of the relevant monitoring points are as follows:

s2.1 according to the requirements of on-site construction, formulating relevant monitoring programs;

s2.2. moving a monitoring trolley to a suitable position and parking the monitoring trolley firmly, debugging an automatic tracking and identification device installed on the monitoring trolley, to make sure that a plurality of automatic tracking and identification devices correspond to the corresponding monitoring lines one by one, and numbering each automatic tracking and identification device, obtaining absolute coordinate values (xQm, yQm, zQm) of each automatic tracking and identification device after measured by a total station, wherein the xQm, yQm, zQm are the absolute coordinate values of the automatic tracking and identification device Q in the x, y and z directions of a tunnel measurement coordinate system after an m-th shift of the monitoring trolley, respectively;

S2.3 aligning a laser ray of the automatic tracking identification device with the corresponding monitoring line, and adjusting a vertical deflection angle $\alpha$ of the automatic tracking and identification device from zero to 90 degrees, as a result of that, an initial lateral deflection angle $\beta$ of each of the plurality of monitoring lines is obtained;

S2.4 starting the cycle monitoring work, adjusting gradually the vertical deflection angle $\alpha$ of the automatic tracking and identification device from 90 degrees to zero, in this process, a reflective marking of the corresponding monitoring point is intelligently captured and a laser point measurement on the monitoring point is carried out, recording the automatic tracking and identification device Q in the monitoring of the m-th displacement position and the i-th cycle monitoring of the trolley:

$$D_n-(x_{Qm}+a_{Qmin},y_{Qm}+b_{Qmin},z_{Qm}+c_{Qmin})-T_{Qmin}$$

where, $(x_{Qm}, y_{Qm}, z_{Qm})$ is an absolute coordinate of the automatic tracking and identification device Q after the monitoring trolley moves its position in the m-th time, $a_{Qmin}$, $b_{Qmin}$ and $c_{Qmin}$ are monitoring variables corresponding to the x, y and z directions, respectively.

$$a_{Qmin}=L_{Qmin}\times\cos\alpha_{Qmin}\sin\beta_{Qmin},$$

$$b_{Qmin}=L_{Qmin}\times\cos\alpha_{Qmin}\cos\beta_{Qmin},$$

$$c_{Qmin}=L_{Qmin}\times\sin\alpha_{Qmin},$$

$L_{Qmin}$ is a corresponding laser ray length;

$\alpha_{Qmin}$ is a corresponding vertical deflection angle;

$\beta_{Qmin}$ is a corresponding transverse deflection angle;

$T_{Qmin}$ is a corresponding monitoring time;

the above control measurement method uses a fixed-point monitoring principle to calculate the deformation of the support structure during the monitoring period, wherein, the automatic tracking and identification device Q, the monitoring section $D_n$, the i-th cycle monitoring at the m-th moving position of the monitoring trolley and the h-th cycle monitoring at the r-th moving position of the monitoring trolley are calculated as follows:

(1) numerical calculation of settlement deformation:

$$\Delta H_{Qn(mi-rh)}=(z_{Qm}+c_{Qmin})-(z_{Qr}+c_{Qrhn});$$

settlement deformation rate calculation of specific monitoring points of monitoring section $D_n$:

$$\Delta VH_{Qn(mi-rh)}=\Delta H_{Qn(mi-rh)}/(T_{Qmin}-T_{Qrhn}):$$

(2) numerical calculation of horizontal convergence:

(2.1) when the y-axis direction of the unit coordinate system of the monitoring point is consistent with the y-axis direction of the tunnel measurement coordinate system, that is, the angle between the two coordinate axes is $\gamma=0$ degrees, the calculation results of the deformation of the support structure are as follows:

Numerical calculation of horizontal convergence of specific monitoring points of monitoring section $D_n$:

$$\Delta X_{Qn(mi-rh)}(x_{Qm}+a_{Qmin})-(x_{Qr}+a_{Qrhn})$$

calculation of horizontal convergence rate of specific monitoring points of monitoring section $D_n$:

$$\Delta VX_{Qn(mi-rh)}=\Delta X_{Qn(mi-rh)}/(T_{Qmin}-T_{Qrhn})$$

numerical calculation of axial deformation of specific monitoring points of monitoring section $D_n$:

$$\Delta Y_{Qn(mi-rh)}=(y_{Qm}+b_{Qmin})-(y_{Qr}+b_{Qrhn})$$

calculation of axial deformation rate of specific monitoring points of monitoring section $D_n$:

$$\Delta VY_{Qn(mi-rh)}=\Delta Y_{Qn(mi-rh)}/(T_{Qmin}-T_{Qrhn})$$

(2.2) when there is an angle between the y-axis direction of the unit coordinate system of the monitoring point and the y-axis direction of the tunnel measurement coordinate system, that is, the angle between the two coordinate axes is $\gamma\neq0$ degrees, the deformation calculation results of the support structure are as follows:

$$\Delta L=((\Delta X_{Qn(mi-rh)})^2+(\Delta Y_{Qn(mi-rh)})^2)^{0.5}\delta=\arctan(\Delta X_{Qn(mi-rh)}/\Delta Y_{Qn(mi-rh)})$$

$$\delta=\arctan(\Delta X_{Qn(mi-rh)}/\Delta Y_{Qn(mi-rh)})$$

$$\theta=180°-\gamma-\delta$$

$$\Delta X'=\Delta L*\sin\theta$$

$$\Delta Y'=\Delta L*\cos\theta$$

in the above formula:

ΔL is the length of the line connecting the coordinate points before and after the deformation of the monitoring point, γ is the angle between the positive direction of the y-axis of the unit coordinate system of the monitoring point and the positive direction of the y-axis of the tunnel measurement coordinate system, δ is the angle between the coordinate point connection before and after the deformation of the monitoring point and the negative direction of the y-axis of the tunnel measurement coordinate system, θ is the angle between the line connecting the coordinate points before and after the deformation of the monitoring point and the positive direction of the y-axis of the unit coordinate system, ΔX' is the displacement value in the x-axis direction of the unit coordinate system of the monitoring point, that is, the horizontal convergence value of the monitoring point, meanwhile, the horizontal convergence rate of the monitoring point is $\Delta X'/(T_{Qmin}-T_{Qrhn})$, ΔY' is the displacement value of the y-axis direction of the unit coordinate system of the monitoring point, that is, the axial displacement value of the monitoring point, meanwhile, the axial displacement rate of the monitoring point is $\Delta Y'/(T_{Qmin}-T_{Qrhn})$, In the above measurement method, in the step 4, according to the cumulative deformation value and deformation rate, the monitoring situation is judged, and the deformation risk judgment criteria of the prefabricated support structure of the system and the corresponding early warning level and automatic emergency measures are processed in the background for monitoring and early warning;

1) A Numerical Judgment Criteria of Cumulative Deformation if the cumulative deformation value of the monitoring point is less than ⅓ of a reserved deformation, it is considered safe and normal monitoring;

if the cumulative deformation value of the monitoring point is between ⅓ and ⅔ of the reserved deformation, a monitoring frequency is automatically doubled, and wireless communication facilities of the tunnel automatic monitoring and measuring equipment are configured to send a reminder signal to a relevant person in charge of the project;

if the cumulative deformation value of the monitoring point is greater than ⅔ of the reserved deformation, the monitoring frequency is automatically tripled, and a risk warning signal is sent to a relevant person in charge of the project through the wireless communication facilities of the tunnel automatic monitoring and measurement equipment;

2) A Deformation Rate Criteria:

if the deformation rate of the monitoring point is less than 0.2 mm/d, it is regarded as safe and normal monitoring;

if the deformation rate of the monitoring point is between 0.2 mm/d and 1 mm/d, the monitoring frequency is automatically doubled, and a reminder signal is sent to relevant person in charge of the project through the wireless communication facilities of the tunnel automatic monitoring and measuring equipment;

if the deformation rate of the monitoring point is greater than 1 mm/d, the monitoring frequency is automatically tripled, and a risk warning signal is sent to a relevant person in charge of the project through the wireless communication facilities of the tunnel automatic monitoring and measuring equipment.

Compared with the existing technology, the present invention discloses a tunnel automatic monitoring and measurement equipment and method based on fixed-point tour measurement, which includes a monitoring trolley that can move freely in the longitudinal direction of the tunnel. On the monitoring trolley, there are several automatic tracking and identification devices connected to the background processing system. On the surface of the tunnel support structure, there are several monitoring points with reflective markings. The monitoring points form several monitoring lines on the tunnel axis, and each automatic tracking and identification device corresponds to a specific monitoring line, through the longitudinal displacement of the monitoring trolley and the intelligent scanning recognition and laser point measurement functions of the automatic tracking and identification device, the reflective markings set on the tunnel support structure can be automatically measured at fixed points, so as to obtain the coordinate information of the relevant monitoring points at different time points; then through the background processing system to calculate the coordinate information, the deformation data of the support structure required for the construction process can be extracted; by matching and analyzing the relevant deformation data with the pre-established criteria for judging the deformation risk of the support structure, the early warning information of the corresponding level is issued, and the corresponding emergency monitoring measures are automatically adopted, which can realize the all-round real-time monitoring and early warning of the tunnel. Under the cooperation of the monitoring trolley and the automatic tracking and identification device, the automatic tracking and identification device can intelligently track and identify the reflective marking laid on the surface of the tunnel support structure, and obtain the coordinate information of the corresponding monitoring points to calculate the deformation of the support structure, which can realize the automatic monitoring effect of a set of automatic tracking and identification device on the full range dynamic interval in the tunnel. Compared with the conventional manual measurement mode that relies on manual operation of measuring instruments such as total station to find the monitoring points after displacement and carry out measurement work, the monitoring process of the present invention is more intelligent and efficient, and the monitoring results are more scientific and reliable.

The beneficial effects of the present invention are:

(1) the present invention locates the monitoring area in the form of fixed monitoring points, the structure deformation monitoring work of a specific monitoring point is not affected by the displacement of the automatic tracking and identification device, and the continuity of the structure deformation monitoring data is guaranteed. Meanwhile, it can extract the settlement deformation data, horizontal convergence data and axial deformation data of the monitoring points in any monitoring period according to the actual needs of construction, which can effectively reflect the deformation of the support structure and guide the on-site construction;

(2) the present invention has simple structure and low cost, and has low performance requirements for the attached monitoring trolley. It only requires that the trolley structure is reliable and can be parked firmly. It can provide a column or beam for fixing the automatic tracking and identification device, and the trolley can move forward with the tunnel excavation, by monitoring the longitudinal forward movement of the trolley and the automatic tracking and identification device installed on it, a set of automatic tracking and identification device can realize the general measurement effect of the dynamic section from the trolley to the working face. The number of automatic tracking and identification devices invested is low, and the main components of the automatic tracking and identification device are intelligent scanning camera and laser ray head. Its manufacturing cost is low, the required use cost is controllable, and it has good economic practicability;

(3) the operation is simple and the requirements for monitoring personnel are low. The automatic processing of data acquisition, calculation and analysis results is realized through the camera scanning positioning+point laser measurement+background processing system. When the monitoring results exceed the risk prediction standard, the early warning information can be issued according to the predetermined procedure and the emergency monitoring measures can be adopted, which can greatly reduce the manpower input and effectively improve the construction safety;

(4) the flexibility of the operation is good, and it can flexibly set up monitoring points with reflective markings according to the needs of deformation monitoring of support structure, and cooperate with the working mode of longitudinal scanning recognition and point laser measurement of intelligent scanning camera, so as to realize the flexible increase and decrease of structural deformation monitoring section, so as to meet the needs of on-site construction for monitoring section to the greatest extent. In addition, the number and location of monitoring lines can be flexibly determined according to actual needs, and the number and installation location of corresponding automatic tracking and identification devices can also be flexibly set. The monitoring schemes provided are flexible and versatile;

(5) the reliability of the operation is strong, adopting the longitudinal monitoring mode, the monitoring direction of the equipment intersects with the axial direction of the tunnel at a small angle, the camera line of sight and the laser ray are not easily blocked by the construction machinery because they are close to the side of the support structure, the interference of the construction operation in the tunnel is small during the monitoring process, which can effectively guarantee the effective duration of the automatic monitoring work;

(6) the equipment has complete functions and the present invention can also indicate the spatial position of the corresponding coordinate points by inputting coordinate information in the background processing system, and then indicating the spatial position of the corresponding coordinate points by the pointing function of the laser ray head of the automatic tracking and identification device, which has certain construction auxiliary function.

Other advantages, objectives and characteristics of the present invention will be described in the subsequent instructions to some extent, and to some extent, based on the following investigation and research, it will be obvious to the technicians in this field, or can be taught from the practice of the present invention. The objectives and other advantages of the present invention can be realized and obtained through the following instructions.

BRIEF DESCRIPTION OF THE DRAWINGS

To make the purpose, technical scheme and advantages of the present invention more clear, the following will further describe the present invention in detail in combination with the drawings, wherein.

DETAILED DESCRIPTION OF THE EMBODIMENTS

Figure 1:
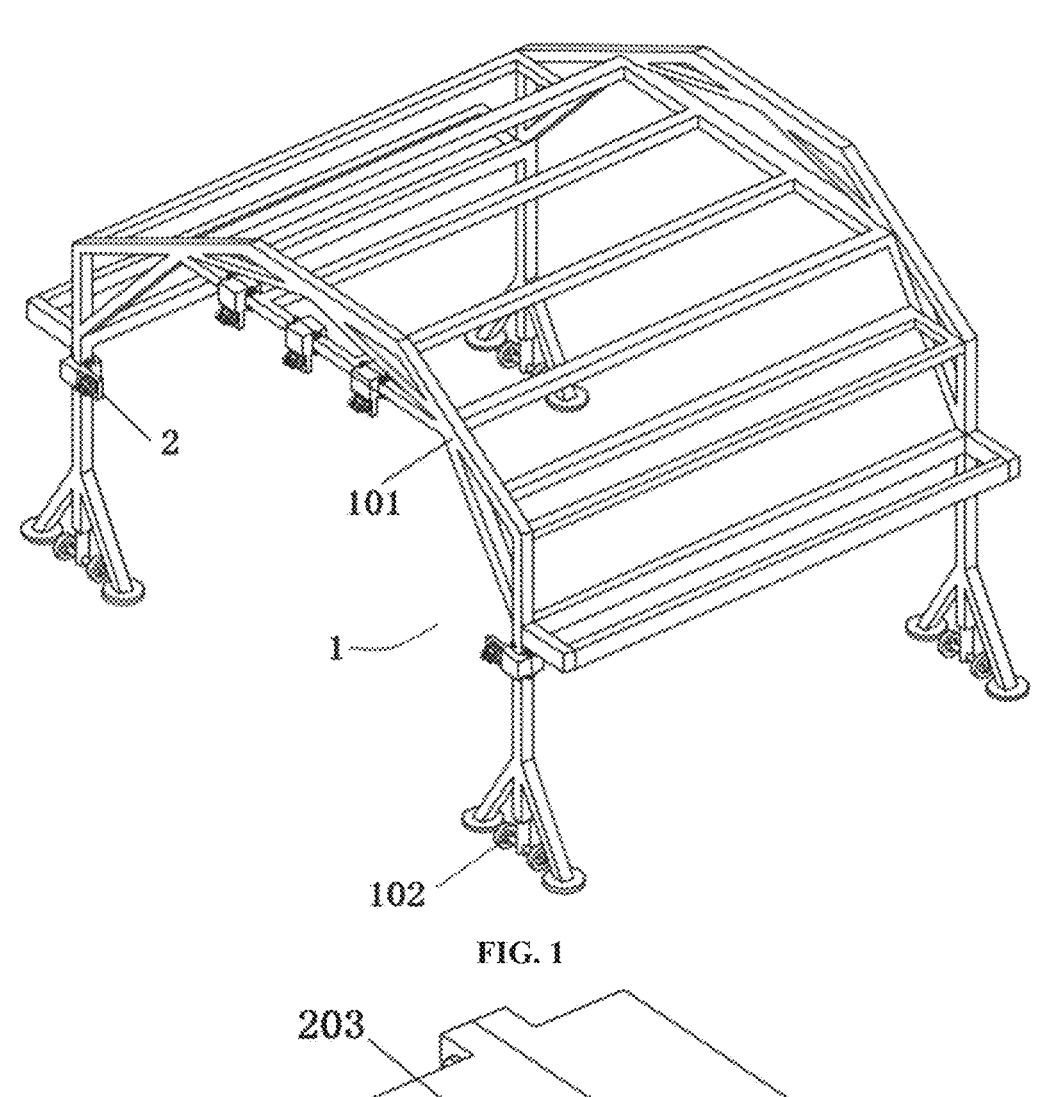
FIG. 1 is a structure diagram of the present invention.

The following will refer to the attached figure to describe the preferred embodiment of the present invention in detail. It should be understood that the preferred embodiment is only to illustrate the invention, not to limit the scope of protection of the present invention.

As shown in FIG. 1-FIG. 5,

A tunnel automatic monitoring and measuring equipment based on fixed-point tour measurement, including a monitoring trolley 1 that can move freely in the longitudinal direction of a tunnel, multiple automatic tracking and identification devices 2 are set on the monitoring trolley 1, the automatic tracking and identification device 2 is connected to the background processing system telecommunication; the number of reflective markings are arranged on the surface of the tunnel support structure to mark the location of the monitoring point, the reflective markings form-the monitoring section in the transverse direction of the tunnel and the monitoring line in the axial direction of the tunnel; each automatic tracking and identification device 2 is relative to the corresponding monitoring line, the automatic tracking and identification device is used to automatically track the reflective marking, collect the monitoring time point of the monitoring point, the displacement coordinate information of the monitoring point and the number of tour monitoring, the background processing system is used to store, analyze and call the data in sequence, and then calculate and analyze the relative monitoring data to obtain the deformation of the support structure; when the deformation exceeds the preset situation, the early warning information can be automatically sent out.

The monitoring trolley 1 is a special monitoring trolley, which includes the arch truss 101 corresponding to the tunnel contour, and the bottom of the arch truss 101 is equipped with a walking mechanism 102.

The arch truss 101 includes a support frame composed of a crossbeam, a number of top beams, a longitudinal beam, and a diagonal brace, the support frame should be larger than the conventional waterproof board trolley and the secondary lining trolley to ensure the smooth passage of the traffic, and try to avoid the collision between the monitoring trolley 1 and the construction vehicle; the bottom end of the support frame is connected with the triangular support foot through the column, the walking mechanism 102 and the vibration monitoring instrument are set in the middle of the triangular support foot.

The automatic tracking and identification device 2 is a multi-piece ring arranged on the front side of the arch truss 101 to realize the all-round detection of the tunnel contour in front of the monitoring trolley 1.

Preferably, the laser ray device 2 is at least five settings, which are installed on the beams and columns of the arch truss 101 and correspond to the tunnel vault, arch waist and arch foot positions, respectively. Specifically, three automatic tracking and identification devices 2 are arranged in the middle and left and right sides of the beam, which are used to monitor the position of the tunnel vault and the arch waist on both sides; the other two automatic tracking and identification devices 2 are arranged on the left and right side of the column, which are used to monitor the position of the arch foot on the left and right sides of the tunnel.

The automatic tracking and identification device includes an intelligent scanning camera 201 and a laser ray head 202, which is connected to the arch truss 101 by a fixed frame that can adjust the lateral deflection angle and vertical deflection angle of the laser ray head 202.

The fixed frame includes a connecting seat 203 which is sleeved with the bar of the arch truss 101, and a connecting plate 204 is arranged on the connecting seat 203, the connecting plate 204 is rotationally connected with a horizontal rotation turntable 205, and a hinge seat 206 is arranged on the horizontal rotation turntable 205, the intelligent scanning camera 201 and the laser ray head 202 are hinged on the hinge seat 206 through the vertical rotation axis 207; the flat rotary turntable 205 and the vertical rotary shaft 207 are connected to the background processing system, the flat rotary turntable 205 can be used to adjust the lateral angle of the automatic tracking and identification device; the vertical rotation axis 207 is used to adjust the vertical angle of the automatic tracking and identification device. Specifically, through the cooperation of the horizontal flat rotating turntable 205 and the vertical rotary axis 207, the remote programmed control of the background processing system can realize the remote automatic adjustment of the degree of freedom of the intelligent scanning camera 201 and the laser ray head 202 in the two directions of the transverse angle and the vertical angle. The automatic tracking and identification device 2 has extremely high flexibility and can realize the monitoring of multiple monitoring points on multiple monitoring lines by a single device.

The background processing system is also connected with the remote controller which controls the movement of the monitoring trolley 1, the mobile monitoring along the longitudinal direction of the tunnel can be realized by controlling the longitudinal movement of the monitoring trolley along the tunnel through the remote controller.

The connecting seat 203 is composed of two halves of anchorage blocks spliced by bolts 2031, at the docking surface of the two halves of anchorage blocks, there is a card slot spliced by two halves, the card slot is matched with the bar of the arch truss 101, so that the two halves of anchorage blocks can be stuck on the bar of the arch truss 101 through the card slot.

According to the installation position of the automatic tracking and identification device in the arch truss 101, the connecting plate 204 is respectively set at the lower part of the connecting seat 203 and the left and right sides to ensure that the connecting plate 204 is tested in the arch truss 101, and the connecting plate 204 and half of the anchoring block are integrated structure.

The flat rotating turntable 205 runs through the connecting plate 204 and is equipped with a coordinate target behind it. The coordinate target is used to assist the positioning of the coordinate points of the automatic tracking and identification device 2. Through the coordinate target, the measuring instrument such as the total station is manually operated from the monitoring station.

In addition, the vibration monitoring instrument is installed on the monitoring trolley. When the vibration monitoring instrument senses that the monitoring trolley is collided and displaced, it immediately sends a collision displacement signal to the person in charge of tunnel monitoring and measurement. The person in charge of monitoring and measurement organizes relevant personnel to check the parking of the monitoring trolley, and re-measure the coordinate points of each automatic tracking and identification device 2, and correct the coordinates.

It also includes explosion-proof sleeve 3, which can be nested outside the flat turntable 205 as a protection device for intelligent scanning camera 201 and laser ray head 202.

Figure 2:
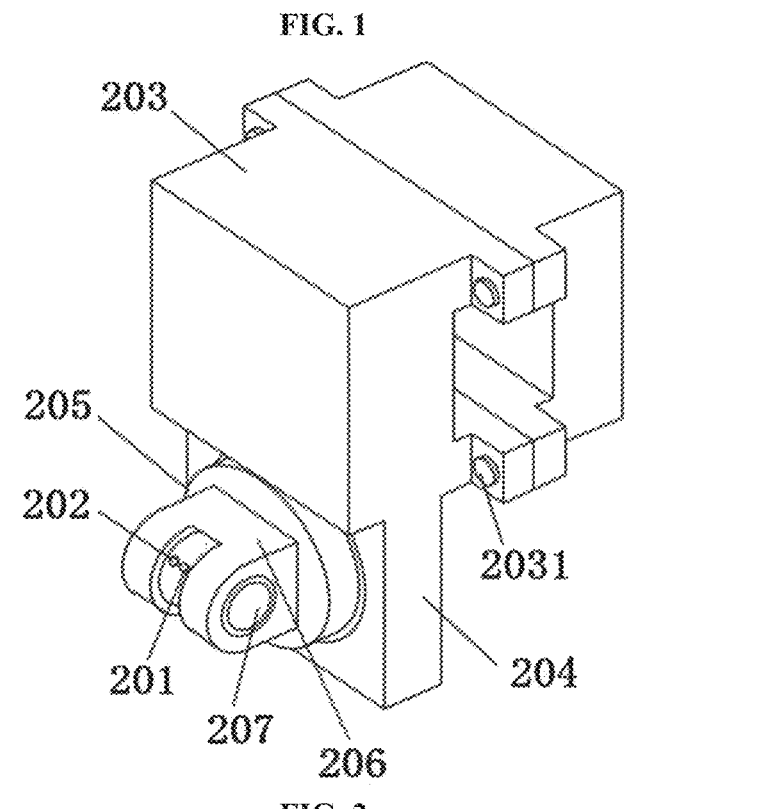
FIG. 2 is a structure diagram showing the connecting plate 204 set in the lower part of the connecting seat 203.
Figure 3:
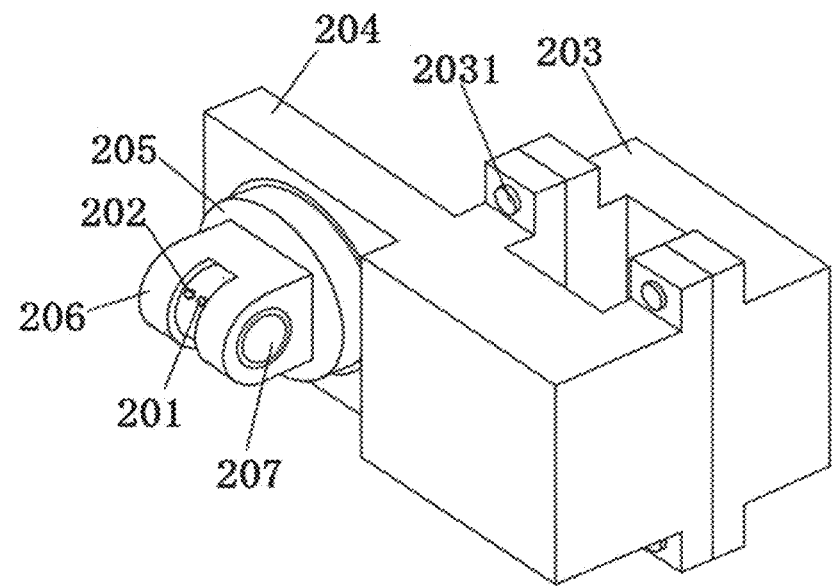
FIG. 3 is a structure diagram showing the connecting plate 204 set on the left side of the connecting seat 203.
Figure 4:
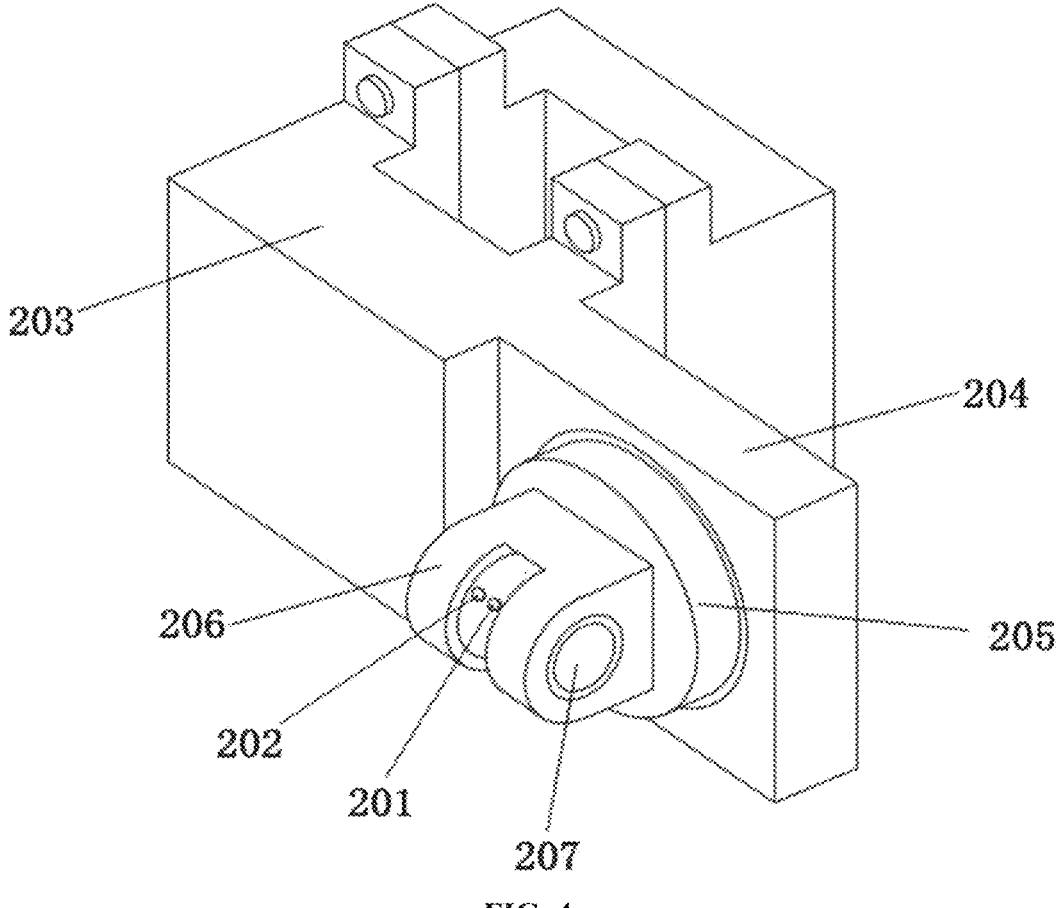
FIG. 4 is a structural diagram showing the connecting plate 204 set on the right side of the connecting seat 203.
Figure 5:
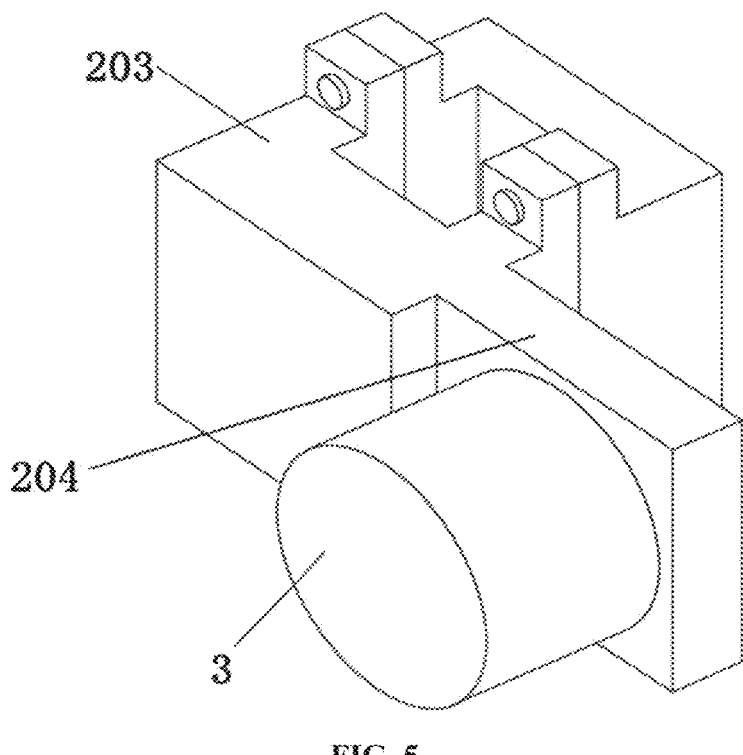
FIG. 5 is an installation diagram of explosion-proof sleeve 3.
Figure 6:
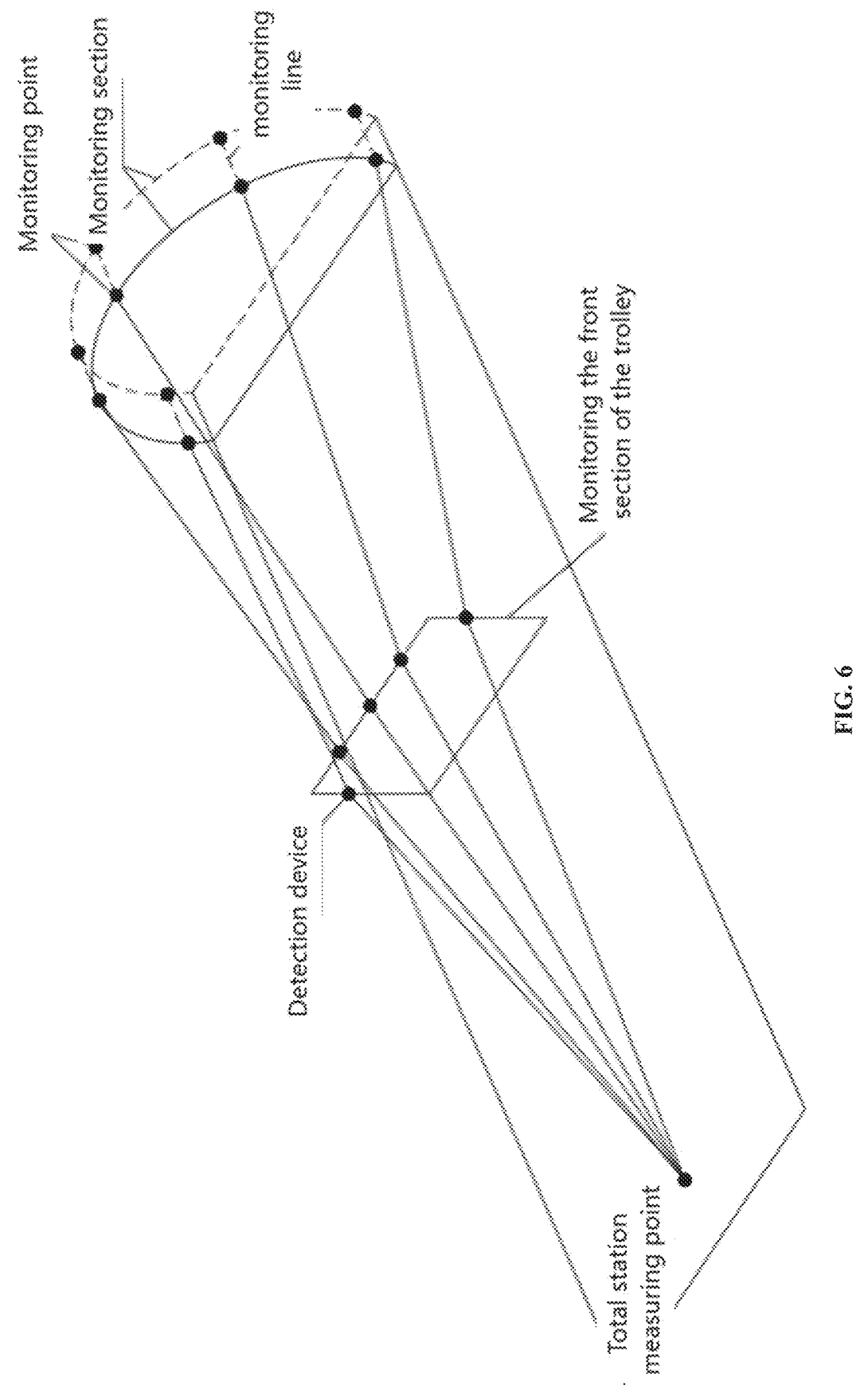
FIG. 6 is a monitoring diagram of the present invention.
Figure 7:
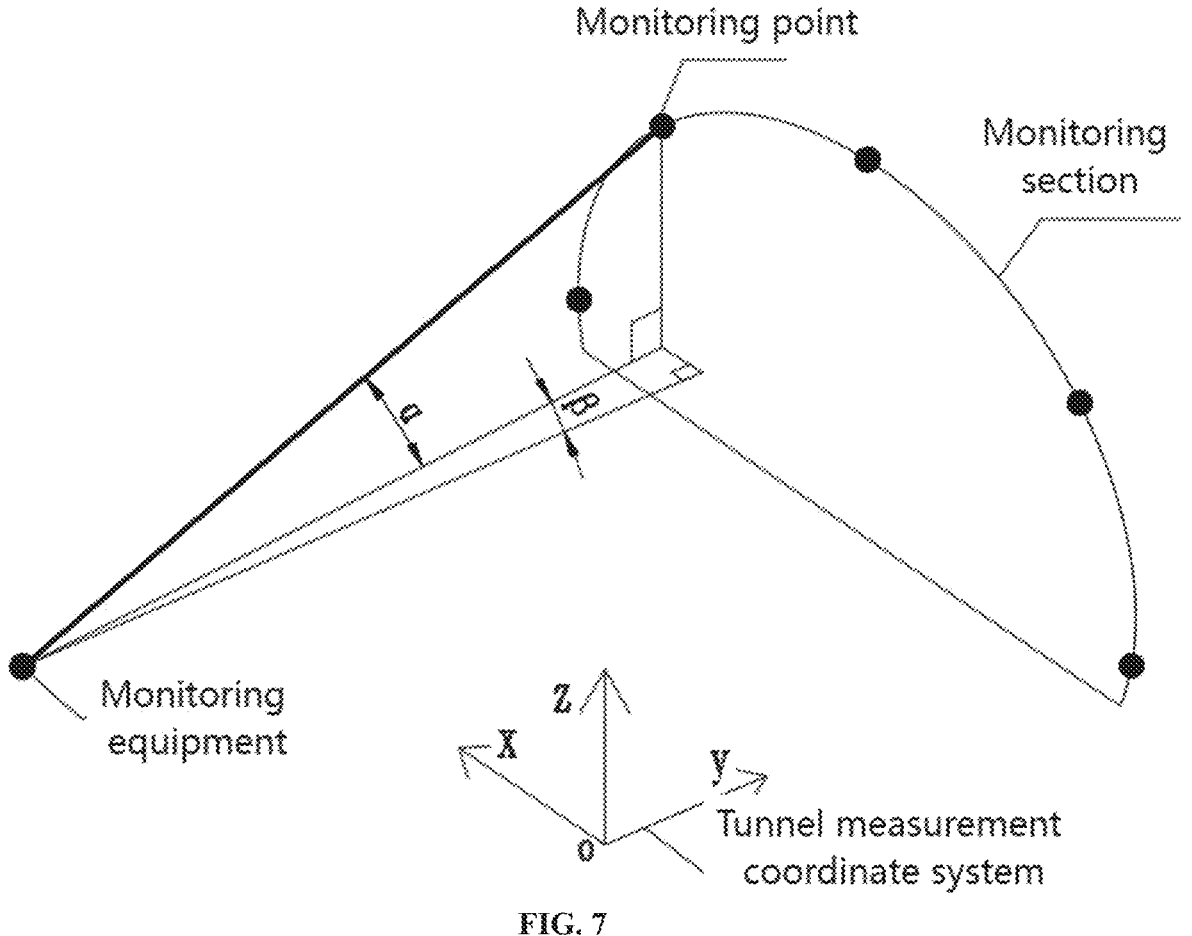
FIG. 7 is a schematic diagram of the laser ray deflection angle of the automatic tracking and identification device.
Figure 8:
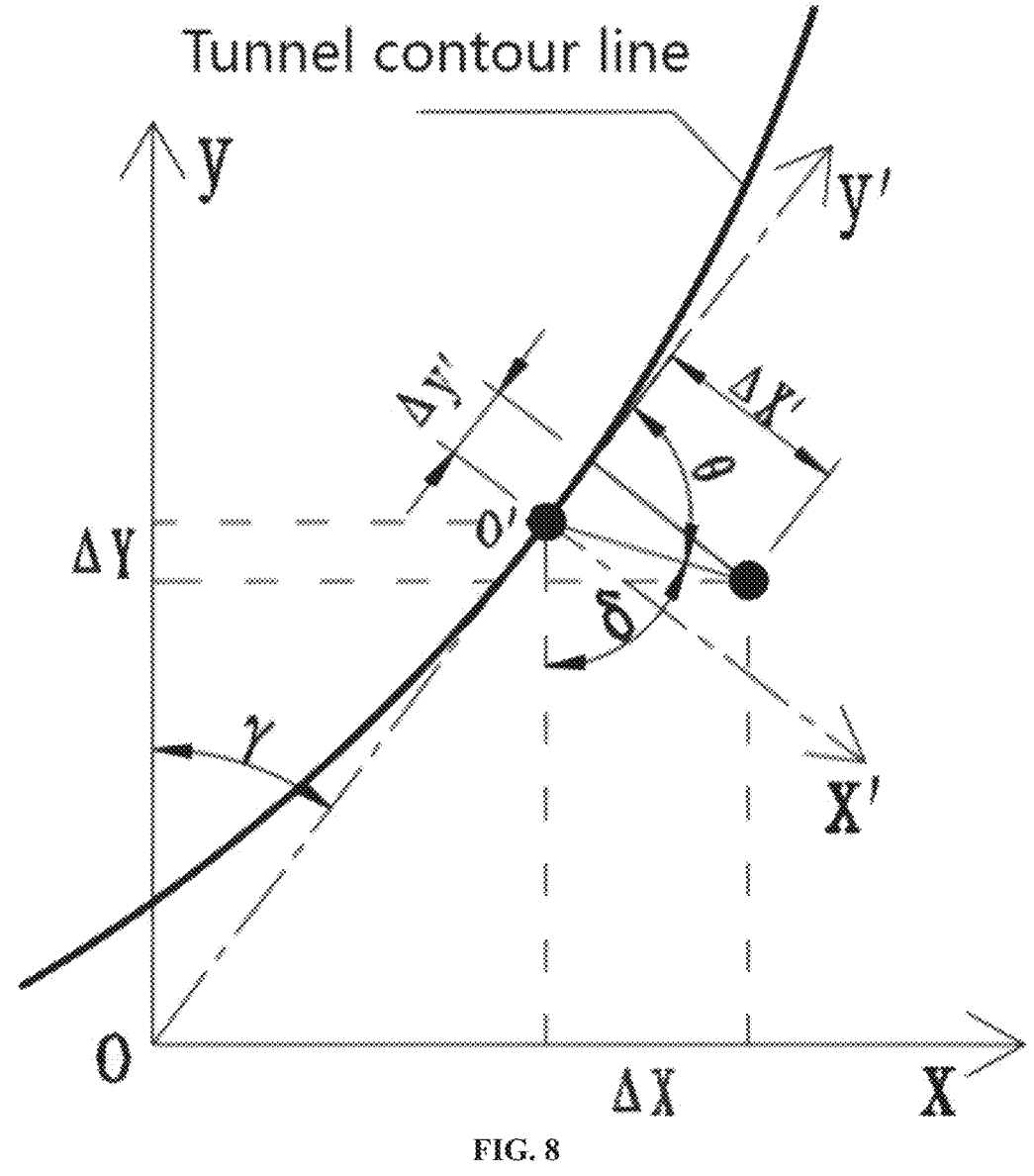
FIG. 8 is a schematic diagram of the numerical coordinate conversion parameters of the monitoring point deformation.

As shown in FIG. 1-FIG. 3,

A tunnel automatic monitoring and measurement method based on fixed-point circuit measurement, which includes the following steps:

s1. multiple sets of monitoring sections are set on the surface of the tunnel support structure, and multiple monitoring points are set on each set of monitoring sections;

s2. the coordinates of the relevant monitoring points at different time points are obtained by the automatic tracking and identification device;

s3. the required initial support deformation data are extracted by calculating the coordinate information of specific monitoring points at different time points;

s4. the corresponding support structure deformation risk criteria are formulated, as well as corresponding early warning levels, and automatic emergency measures.

In step s1, the longitudinal positions of the monitoring points on each group of monitoring sections are in one-to-one correspondences, so that the monitoring points on multiple sets of monitoring sections constitute multiple monitoring lines. Preferably, at least five monitoring points are set on each group of monitoring sections, are arranged at the vault of the tunnel, and are symmetrically arranged at the arch waist and arch foot positions relative to the vault, so that the monitoring points on multiple sets of monitoring sections constitute five monitoring lines, and the vault, arch waist and arch foot of the tunnel are monitored separately.

In step s2, the tunnel measurement coordinate system and the unit coordinate system of the monitoring point are collected, the tunnel measurement coordinate system is consistent with the construction control network coordinate system of the project to ensure the universality of the measurement results; the unit coordinate system of the monitoring point described in this paper takes the tangent line direction of the on-line position of the monitoring point as the positive direction of the y-axis, the vertical direction as the z-axis direction, and then the x-axis direction is determined according to the right-hand law; reflective marking is set on each monitoring point, and automatic intelligent tracking and recognition is carried out through automatic tracking and identification device; specifically, the automatic tracking and identification device with intelligent scanning camera is used to automatically patrol and identify the reflective marking according to the preset program, and then the coordinate information of the relevant monitoring points is collected by point laser measurement, which includes the longitudinal deflection angle, transverse deflection angle, laser ray length, monitoring time point, automatic tracking and identification device displacement coordinates and tour monitoring number information of laser rays during monitoring work.

Specifically, the coordinate data acquisition and calculation steps of the relevant monitoring points are as follows:

s2.1 according to the requirements of on-site construction, formulating relevant monitoring programs are formulated and then the monitoring points are arranged on the surface of the support structure;

s2.2. a monitoring trolley is moved to a suitable position and the monitoring trolley is parked firmly, an automatic tracking and identification device installed on the monitoring trolley is debugged to make sure that a plurality of automatic tracking and identification devices correspond to the corresponding monitoring lines one by one, and each automatic tracking and identification device is numbered, absolute coordinate values $(x_{Qm}, y_{Qm}, z_{Qm})$ of each automatic tracking and identification device after measured by a total station are obtained, wherein the $x_{Qm}, y_{Qm}, z_{Qm}$ are the absolute coordinate values of the automatic tracking and identification device Q in the x, y and z directions of a tunnel measurement coordinate system after an m-th shift of the monitoring trolley, respectively;

S2.3 a laser ray of the automatic tracking identification device is aligned with the corresponding monitoring line, and a vertical deflection angle $\alpha$ of the automatic tracking and identification device is adjusted from zero to 90 degrees, as a result of that, an initial lateral deflection angle $\beta$ of each of the plurality of monitoring lines is obtained;

S2.4 the cycle monitoring work is started, the vertical deflection angle $\alpha$ of the automatic tracking and identification device is adjusted gradually from 90 degrees to zero, in this process, a reflective marking of the corresponding monitoring point is intelligently captured and a laser point measurement on the monitoring point is carried out, recording the automatic tracking and identification device Q in the monitoring of the m-th displacement position and the i-th cycle monitoring of the trolley:

$$D_n-(x_{Qm}+a_{Qmin}, y_{Qm}+b_{Qmin}, z_{Qm}+c_{Qmin})-T_{Qmin}$$

where, $(x_{Qm}, y_{Qm}, z_{Qm})$ is the absolute coordinate of the automatic tracking and identification device Q at the m-th displacement position of the monitoring trolley, $a_{Qmin}$, $b_{Qmin}$ and $c_{Qmin}$ are the monitoring variables corresponding to the x, y and z directions, respectively, $$a_{Qmin}=L_{Qmin}\times\cos\alpha_{Qmin}\sin\beta_{Qmin},$$

$$b_{Qmin}=L_{Qmin}\times\cos\alpha_{Qmin}\cos\beta_{Qmin},$$

$$c_{Qmin}=L_{Qmin}\times\sin\alpha_{Qmin},$$

$L_{Qmin}$ is the corresponding laser ray length;
$\alpha_{Qmin}$ is the corresponding vertical deflection angle;
$\beta_{Qmin}$ is the corresponding transverse deflection angle;
$T_{Qmin}$ is the corresponding monitoring time.

The specific examples of setting up five monitoring lines at the tunnel vault, arch waist and arch foot are as follows:

the automatic tracking and identification devices are numbered, and the absolute coordinate values of each automatic tracking and identification device are obtained by total station measurement, that is, the absolute coordinates of the automatic tracking and identification device I under the first moving position of the monitoring trolley $(x_{11}, y_{11}, z_{11})$, the absolute coordinates of the automatic tracking and identification device II $(x_{21}, y_{21}, z_{21})$ . . . , according to the above method, the absolute coordinates $(x_{12}, y_{12}, z_{12})$, $(x_{22}, y_{22}, z_{22})$ . . . ., $(x_{13}, y_{13}, z_{13})$, $(x_{23}, y_{23}, z_{23})$ . . . , , . . . , $(z_{1m}, y_{1m}, z_{1m})$, $(x_{2m}, y_{2m},$ $z_{2m})$ . . . of the automatic tracking and identification device under the subsequent moving position of the monitoring trolley are obtained;

by adjusting the horizontal rotation turntable of each automatic tracking and identification device, the lens of the intelligent scanning camera of each automatic tracking and identification device aligns the five monitoring lines of vault, arch waist and arch foot respectively, the transverse deflection angles $\beta_{11}, \beta_{21}, \beta_{31}, \beta_{41}$ and $\beta_{51}$ at this time were recorded respectively, the transverse deflection angles $\beta_{11}, \beta_{21}, \beta_{31}, \beta_{41}$ and $\beta_{51}$ correspond to the initial transverse deflection angles of the five monitoring lines under the first moving position of the monitoring trolley, before each tour monitoring activity of the first moving position of the monitoring trolley, the lateral deflection angle of the automatic tracking and identification device is adjusted to the above angle;

according to the above method, the initial lateral deflection angles $\beta_{12}, \beta_{22}, \beta_{32}, \beta_{42}, \beta_{52} \cdots \beta_{1m}, \beta_{2m}, \beta_{3m}, \beta_{4m}, \beta_{5m}$ under the subsequent moving position of the monitoring trolley are obtained;

by adjusting the vertical rotation axis of each automatic tracking and identification device, the longitudinal deflection angle $\alpha$ of the automatic tracking and identification device is adjusted from zero to 90 degrees, and then the longitudinal deflection angle $\alpha$ of the automatic tracking and identification device is continuously adjusted by the vertical rotation axis, the angle $\alpha$ is dynamically identified by the intelligent scanning camera in the scanning area of the camera; when the intelligent scanning camera recognizes the first reflective marking, the automatic tracking and identification device fine-tunes the lateral deviation angle $\beta$ and the longitudinal deviation angle $\alpha$ of the automatic tracking and identification device through the horizontal flat rotating turntable and the vertical rotary axis, so that the laser ray is aligned with the reflective marking, and the point laser measurement work is carried out. The specific process is as follows:

at the first displacement position of the monitoring trolley, the transverse deflection angle of the laser ray of the automatic tracking and identification device I to the reflective marking point of the monitoring section $D_1$ arch is recorded as $\beta_{1111}$, the longitudinal deflection angle is recorded as $\alpha_{1111}$, and the distance length of the laser ray is $L_{1111}$ and the monitoring time point is $T_{1111}$;

according to the coordinate information $(x_{11}, y_{11}, z_{11})$ of the automatic tracking and identification device I, the coordinates of the reflective identification points at the arch of the monitoring section $D_1$ can be obtained by calculation $(x_{11}+a_{1111}, y_{11}+b_{1111}, z_{11}+c_{1111})$, where:

$$a_{1111}=L_{1111}\times\cos\alpha_{1111}\sin\beta_{1111};$$

$$b_{1111}=L_{1111}\times\cos\alpha_{1111}\cos\beta_{1111};$$

$$c_{1111}=L_{1111}\times\sin\alpha_{1111};$$

recording the monitoring information of the reflective marking point of the $D_1$ arch of the monitoring section in the monitoring of the first displacement position and the first cycle of the automatic tracking and identification device I: $D_1-(x_{11}+a_{1111}, y_{11}+b_{1111}, z_{11}+c_{1111})-T_{1111}$;

then, the lateral deflection angle $\beta$ of the automatic tracking and identification device I is adjusted back to $\beta11$, and then the longitudinal deflection angle $\alpha$ of the automatic tracking and identification device is continuously reduced through the vertical shaft, and the reflective marking in the scanning area of the camera is dynamically identified by the intelligent scanning camera until the intelligent scanning camera recognizes the next reflective marking, and then the point laser measurement is carried out again according to the above principle;

recording the monitoring information of the reflective marking point of the $D_n$ arch of the monitoring section in the monitoring of the first displacement position and the first cycle of the automatic tracking and identification device I: $D_n-(x_{11}+a_{111n}, y_{11}+b_{111a}, z_{11}+c_{111n})-T_{111n}$;

the above monitoring work is continued until the longitudinal deflection angle $\alpha$ is adjusted from 90 degrees to 0 degrees, at this time, it is considered that the automatic tracking and identification device I completes its first cycle monitoring work at the first displacement position of the monitoring trolley; through the vertical shaft, the longitudinal deflection angle is adjusted to 90 degrees of the initial state at one time, and then the monitoring work of the next cycle is started after a certain period of time, the interval time period can be dynamically adjusted according to the frequency of monitoring;

recording the monitoring information of the reflective marking point of the $D_n$ arch of the monitoring section in the monitoring of the first displacement position and the i-th cycle of the automatic tracking and identification device I: $D_n-(x_{11}+a_{11in}, y_{11}+b_{11in}, z_{11}+c_{11in})-T_{11in}$;

with the advance of the tunnel, the tunnel face and the support structure are pushed forward, after a period of time, the position of the automatic tracking and identification device will be lagging behind, at this time, it is necessary to move the monitoring trolley forward, so as to ensure that the automatic tracking and identification device can always monitor the support structure of the dynamic section between the front face and the tunnel face;

recording the monitoring information of the reflective marking point of the $D_n$ arch of the monitoring section in the monitoring of the m-th displacement position and the i-th cycle of the automatic tracking and identification device I: $D_n-(x_{1m}+a_{1min}, y_{1m}+b_{1min}, z_{1m}+c_{1min})-T_{1min}$;

the monitoring information of automatic tracking and identification device II, automatic tracking and identification device III . . . automatic tracking and identification device V can be obtained.

Similarly, recording the monitoring information of the reflective marking point corresponding to the monitoring position of the $D_n$ arch of the monitoring section in the monitoring of the m-th displacement position and the i-th cycle of the automatic tracking and identification device Q: $D_n-(x_{Qm}+a_{Qmin}, y_{Qm}+b_{Qmin}, z_{Qm}+c_{Qmin})-T_{Qmin}$;

in step s3, the deformation calculation of the support structure during the monitoring period is carried out by using the principle of fixed point monitoring;

where, the automatic tracking and identification device Q, the monitoring section $D_n$, the i-th cycle monitoring at the m-th moving position of the monitoring trolley and the h-th cycle monitoring at the r-th moving position of the monitoring trolley, the deformation of the same monitoring point on the support structure is calculated as follows:

(1) numerical calculation of settlement deformation:

$$\Delta H_{Qn(mi-rh)}=(z_{Qm}+c_{Qmin})-(z_{Qr}+c_{Qrhn}),$$

settlement deformation rate calculation of specific monitoring points of monitoring section $D_n$:

$$\Delta VH_{Qn(mi-rh)}=\Delta H_{Qn(mi-rh)}/(T_{Qmin}-T_{Qrhn}),$$

in the formula, $z_{Qm}$ and $z_{Qr}$ are the z-axis absolute coordinates of the automatic tracking and identification device Q after the m-th and r-th moving positions of the monitoring trolley, $c_{Qmin}$ and $c_{Qrhn}$ are the corresponding monitoring variables, respectively, $T_{Qmin}$ and $T_{Qrhn}$ are the corresponding monitoring time, respectively;

(2) numerical calculation of horizontal convergence:

(2.1) when the positive direction of the y axis of the unit coordinate system of the monitoring point is consistent with the positive direction of the y axis of the tunnel measurement coordinate system, that is, the angle between the two is $\gamma=0$ degree, the calculation results of the deformation of the support structure are as follows:

the horizontal convergence numerical calculation of specific monitoring points of monitoring section $D_n$:

$$\Delta X_{Qn(mi-rh)}=(x_{Qm}+a_{Qmin})-(x_{Qr}+a_{Qrhn})$$

the horizontal convergence rate calculation of the specific monitoring points of the monitoring section $D_n$:

$$\Delta VX_{Qn(mi-rh)}=\Delta X_{Qn(mi-rh)}/(T_{Qmin}-T_{Qrhn})$$

the axial deformation numerical calculation of specific monitoring points of monitoring section $D_n$:

$$\Delta Y_{Qn(mi-rh)}=(y_{Qm}+b_{Qmin})-(y_{Qr}+b_{Qrhn})$$

the axial deformation rate calculation of specific monitoring points of monitoring section $D_n$:

$$\Delta VY_{Qn(mi-rh)}=\Delta Y_{Qn(mi-rh)}/(T_{Qmin}-T_{Qrhn})$$

(2.2) when there is an angle between the y-axis direction of the unit coordinate system and the y-axis direction of the tunnel measurement coordinate system, that is, the angle between the two is $\gamma\neq0$ degree, the calculation results of the deformation of the support structure are as follows:

$$\Delta L=((\Delta X_{Qn(mi-rh)})^2+(\Delta Y_{Qn(mi-rh)})^2)^{0.5}$$

$$\delta=\arctan(\Delta X_{Qn(mi-rh)}/\Delta Y_{Qn(mi-rh)})$$

$$\theta=180°-\gamma-\delta$$

$$\Delta X'=\Delta L*\sin\theta$$

$$\Delta Y'=\Delta L*\cos\theta$$

in the above formula:

the $x_{Qm}$ and $x_{Qr}$ are the absolute coordinate in the x-axis direction of the automatic tracking and identification device Q after the m-th and r-th moving positions of the monitoring trolley, the $y_{Qm}$ and $y_{Qr}$ are the absolute coordinate in the y-axis direction of the automatic tracking and identification device Q after the m-th and r-th moving positions of the monitoring trolley, $a_{Qmin}$, $a_{Qrhn}$, $b_{Qmin}$ and $b_{Qrhn}$ are the corresponding monitoring variables respectively, $T_{Qmin}$, $T_{Qrhn}$, $T_{Qmin}$, $T_{Qrhn}$ are the corresponding monitoring time respectively, $\Delta L$ is the length of the line connecting the coordinate points before and after the deformation of the monitoring point;

$\gamma$ is the angle between the positive direction of the y-axis of the unit coordinate system of the monitoring point and the positive direction of the y-axis of the tunnel measurement coordinate system, $\delta$ is the angle between the coordinate point connection before and after the deformation of the monitoring point and the negative direction of the y-axis of the tunnel measurement coordinate system, $\theta$ is the angle between the line connecting the coordinate points before and after the deformation of the monitoring point and the positive direction of the y axis of the unit coordinate system of the monitoring point, $\Delta X'$ is the displacement value in the x-axis direction of the unit coordinate system of the monitoring point, that is, the horizontal convergence value of the monitoring point, at this time, the horizontal convergence rate of the monitoring point is $\Delta X'/(T_{Qmin}-T_{Qrhn})$, $\Delta Y'$ is the displacement value of the y-axis direction of the unit coordinate system of the monitoring point, that is, the axial displacement value of the monitoring point, at this time, the axial displacement value of the monitoring point is $\Delta Y'/(T_{Qmin}-T_{Qrhn})$.

in step s4, through the background system of the automatic tracking and identification device, a variety of support structure deformation risk judgment criteria and corresponding early warning levels and automatic emergency measures are formulated in advance, if the monitoring data exceeds any one of the risk judgment criteria during the monitoring process, the automatic tracking and identification device immediately issues early warning information according to the predetermined procedure and takes the predetermined emergency procedure:

1) A Cumulative Deformation Numerical Criteria:

if the cumulative deformation value of the monitoring point is less than ⅓ of a reserved deformation, it is considered safe and normal monitoring;

if the cumulative deformation value of the monitoring point is between ⅓ and ⅔ of the reserved deformation, a monitoring frequency is automatically doubled, and wireless communication facilities of the tunnel automatic monitoring and measuring equipment are configured to send a reminder signal to a relevant person in charge of the project;

if the cumulative deformation value of the monitoring point is greater than ⅔ of the reserved deformation, the monitoring frequency is automatically tripled, and a risk warning signal is sent to a relevant person in charge of the project through the wireless communication facilities of the tunnel automatic monitoring and measurement equipment;

2) A Deformation Rate Criteria:

if the deformation rate of the monitoring point is less than 0.2 mm/d, it is regarded as safe and normal monitoring;

if the deformation rate of the monitoring point is between 0.2 mm/d and 1 mm/d, the monitoring frequency is automatically doubled, and a reminder signal is sent to relevant person in charge of the project through the wireless communication facilities of the tunnel automatic monitoring and measuring equipment;

if the deformation rate of the monitoring point is greater than 1 mm/d, the monitoring frequency is automatically tripled, and a risk warning signal is sent to a relevant person in charge of the project through the wireless communication facilities of the tunnel automatic monitoring and measuring equipment;

other risk criteria can be formulated according to the actual situation on site.

When it is necessary to issue a monitoring measurement report, in addition to providing specific monitoring data, the monitoring time can also be used as the abscissa and the cumulative deformation value as the ordinate to fit the settlement deformation curve and horizontal convergence curve of the characteristic monitoring points. Or through the coordinate data of multiple monitoring points at a specific monitoring time, the three-dimensional structure model of the tunnel at a specific time point is fitted, and the spatial deformation of the tunnel structure can be stereoscopically presented by the volume difference of the three-dimensional structure model of the tunnel at two specific time points.

In addition, with the help of the laser ray pointing function of the automatic tracking and identification device, a specific coordinate position can be preset by the background processing system connected to the automatic tracking and identification device, and the laser ray of the automatic tracking and identification device can be manipulated to mark the corresponding point position in the tunnel, which can be used to assist the construction to a certain extent.

The above is only a better embodiment of the present invention, and it is not a restriction on any form of confidentiality of the invention. Any simple modification, equivalent change and modification of the above embodiments that are not separated from the content of the technical scheme of the invention and based on the technical essence of the invention are still within the scope of the technical scheme of the present invention.

What is claimed is:

1. A tunnel automatic monitoring and measurement method based on a fixed-point tour measurement, comprising following steps:

s1: setting a plurality of sets of monitoring sections on a surface of a tunnel support structure, and setting a plurality of monitoring points on each of the plurality of sets of monitoring sections, wherein longitudinal positions of adjacent monitoring points are in one-to-one correspondences, and wherein the monitoring points on the plurality of sets of monitoring sections constitute a plurality of monitoring lines;

s2: obtaining coordinate information of relevant monitoring points at different time points through a tour monitoring method of a tunnel automatic monitoring and measuring equipment;

coordinate data acquisition and calculation steps of the relevant monitoring points are as follows:

s2.1: according to requirements of on-site construction, formulating relevant monitoring programs;

s2.2: moving a monitoring trolley to a suitable position and parking the monitoring trolley, adjusting positions of each of a plurality of automatic tracking and identification devices installed on the monitoring trolley to make sure that the plurality of automatic tracking and identification devices correspond to corresponding monitoring lines one by one, and numbering each of the plurality of automatic tracking and identification devices, obtaining absolute coordinate values ($x_{Qm}$, $y_{Qm}$, $z_{Qm}$) of each of the plurality of automatic tracking and identification devices by a total station, wherein the $x_{Qm}$, $y_{Qm}$, $z_{Qm}$ are the absolute coordinate values of an automatic tracking and identification device Q of the plurality of automatic tracking and identification devices in x, y and z directions of a tunnel measurement coordinate system after an m-th shift of the monitoring trolley, respectively;

s2.3: aligning a laser ray of each of the plurality of automatic tracking identification devices with a corresponding monitoring line, and adjusting a vertical deflection angle $\alpha$ of each of the plurality of automatic tracking and identification devices from zero to 90 degrees, as a result of that, an initial lateral deflection angle $\beta$ of each of the plurality of monitoring lines is obtained;

s2.4: starting a cycle monitoring work, adjusting the vertical deflection angle $\alpha$ of each of the plurality of automatic tracking and identification devices from 90 degrees to zero, wherein in this process, monitoring information of a reflective marking of corresponding monitoring point is captured and a laser point measurement is performed on the corresponding monitoring point, recording monitoring information of a reflective marking of a monitoring section $D_n$ measured by the automatic tracking and identification device Q when the monitoring trolley is in an m-th displacement position and an i-th cycle of monitoring, wherein the monitoring information comprises:

$$D_n - (x_{Qm} + a_{Qmin}, y_{Qm} + b_{Qmin}, z_{Qm} + c_{Qmin}) - T_{Qmin}$$

wherein $(x_{Qm}, y_{Qm}, z_{Qm})$ is an absolute coordinate of the automatic tracking and identification device Q after the monitoring trolley moves its position in an m-th time, $a_{Qmin}$, $b_{Qmin}$ and $c_{Qmin}$ are monitoring variables corresponding to the x, y and z directions, respectively;

$$a_{Qmin} = L_{Qmin} \times \cos \alpha_{Qmin} \sin \beta_{Qmin},$$

$$b_{Qmin} = L_{Qmin} \times \cos \alpha_{Qmin} \cos \beta_{Qmin},$$

$$c_{Qmin} = L_{Qmin} \times \sin \alpha_{Qmin},$$

$L_{Qmin}$ is a laser ray length;
$\alpha_{Qmin}$ is a vertical deflection angle;
$\beta_{Qmin}$ is a transverse deflection angle; and
$T_{Qmin}$ is a monitoring time;

s3: extracting required initial support deformation data by calculating coordinate information of specific monitoring points at different time points; and s4: formulating a corresponding support structure deformation risk criteria, as well as corresponding early warning levels, and automatic emergency measures.

2. The tunnel automatic monitoring and measurement method based on the fixed-point tour measurement according to claim 1, wherein in step s1, at least five monitoring points are set on each of the plurality of sets of monitoring sections, at least five monitoring points are arranged in a tunnel vault, and at least five monitoring points are symmetrically arranged in an arch waist and arch foot position relative to the tunnel vault, wherein the at least five monitoring points on each of the plurality of sets of monitoring sections constitute five monitoring lines to monitor the tunnel vault, the arch waist and the arch foot respectively.

3. The tunnel automatic monitoring and measurement method based on the fixed-point tour measurement according to claim 1, wherein in step s2, the tunnel automatic monitoring and measuring equipment comprises the monitoring trolley allowed to move freely in a longitudinal direction of a tunnel, the plurality of automatic tracking and identification devices are set on the monitoring trolley, and the plurality of automatic tracking and identification devices are connected to a background processing system through a telecommunication; a number of reflective markings used to mark a location of a monitoring point are arranged on a surface of the tunnel support structure, the reflective markings form monitoring sections in a transverse direction of the tunnel and monitoring lines in an axial direction of the tunnel; each of the plurality of automatic tracking and identification devices is relative to a corresponding monitoring line; each of the plurality of automatic tracking and identification devices comprises an intelligent scanning camera and a laser ray head, and each of the plurality of automatic tracking and identification devices is fixed on an arch truss by a fixed frame, wherein the fixed frame is allowed to adjust transverse and vertical deflection angles of the laser ray head;

collecting a tunnel measurement coordinate system and an unit coordinate system of the plurality of monitoring points, the tunnel measurement coordinate system is consistent with a construction control network coordinate system of a project; the unit coordinate system of the plurality of monitoring points takes a tangent line direction of an on-line position of the plurality of monitoring points as a positive direction of a y-axis, and a vertical direction is a z-axis direction, and an x-axis direction is determined according to a right-handed law;

setting a reflective marking on each of the plurality of monitoring points, using each one of the plurality of automatic tracking and identification devices with an intelligent scanning camera to realize an automatic intelligent tracking and recognition of reflective markings, collecting unit coordinate information of relevant monitoring points by a laser point measurement, comprising collecting a longitudinal deflection angle, and a transverse deflection angle of a laser ray, the laser ray length, a monitoring time point, automatic tracking and identification device displacement coordinates and tour monitoring number information in a monitoring work.

4. The tunnel automatic monitoring and measurement method based on the fixed-point tour measurement according to claim 3, wherein the monitoring trolley comprises the arch truss corresponding to a tunnel contour, a plurality of walking mechanisms are set at a bottom of the arch truss, and the plurality of automatic tracking and identification devices are arranged in a ring on a front side of the arch truss to realize a comprehensive detection of the tunnel contour in front of the monitoring trolley.

5. The tunnel automatic monitoring and measurement method based on the fixed-point tour measurement according to claim 3, wherein the fixed frame comprises a connecting seat sleeved with a bar of the arch truss, a connecting plate is arranged on the connecting seat, the connecting plate is rotationally connected with a horizontal rotation turntable, a coordinate target is arranged on a back of the horizontal rotation turntable, and a hinge seat is arranged in a front of the horizontal rotation turntable, the intelligent scanning camera and the laser ray head are hinged on the hinge seat through a vertical rotation shaft.

6. The tunnel automatic monitoring and measurement method based on the fixed-point tour measurement according to claim 3, wherein a deformation calculation of the tunnel support structure during a monitoring period is carried out by using a principle of fixed point monitoring:

wherein regarding the automatic tracking and identification device Q and the monitoring section $D_n$, deformations of monitoring points under an i-th cycle monitoring at an m-th moving position of the monitoring trolley and an h-th cycle monitoring at an r-th moving position of the monitoring trolley are calculated as follows:

(1) a numerical calculation of settlement deformation:

$$\Delta H_{Qn(mi-rh)}=(z_{Qm}+c_{Qmin})-(z_{Qr}+c_{Qrhn});$$

a settlement deformation rate calculation of specific monitoring points of monitoring section $D_n$:

$$\Delta VH_{Qn(mi-rh)}=\Delta H_{Qn(mi-rh)}/(T_{Qmin}-T_{Qrhn});$$

(2) a numerical calculation of horizontal convergence:

(2.1) when a y-axis direction of the unit coordinate system of the plurality of monitoring points is consistent with a y-axis direction of the tunnel measurement coordinate system: an angle γ between the y-axis direction of the unit coordinate system of the plurality of monitoring points and the y-axis direction of the tunnel measurement coordinate system is equal to 0 degree, deformation calculation results of the tunnel support structure are as follows:

a numerical calculation of horizontal convergence of specific monitoring points of monitoring section $D_n$:

$$\Delta X_{Qn(mi-rh)}=(x_{Qm}+a_{Qmin})-(x_{Qr}+a_{Qrhn})$$

a calculation of horizontal convergence rate of specific monitoring points of monitoring section $D_n$:

$$\Delta VX_{Qn(mi-rh)}-\Delta X_{Qn(mi-rh)}/(T_{Qmin}-T_{Qrhn})$$

a numerical calculation of axial deformation of specific monitoring points of monitoring section $D_n$:

$$\Delta Y_{Qn(mi-rh)}=(y_{Qm}+b_{Qmin})-(y_{Qr}+b_{Qrhn})$$

a calculation of axial deformation rate of specific monitoring points of monitoring section $D_n$:

$$\Delta VY_{Qn(mi-rh)}=\Delta Y_{Qn(mi-rh)}/(T_{Qmin}-T_{Qrhn})$$

(2.2) when there is an angle γ between the y-axis direction of the unit coordinate system of the plurality of monitoring points and the y-axis direction of the tunnel measurement coordinate system, and the angle γ is not equal to 0 degree, deformation calculation results of the tunnel support structure are as follows:

$$\Delta L=((\Delta XQn_{(mi-rh)})^2+(\Delta YQn_{(mi-rh)})^2)^{0.5}$$

$$\delta=\arctan(\Delta X_{Qn(mi-rh)}/\Delta Y_{Qn(mi-rh)})$$

θ=180°−γ−δ

ΔX'=ΔL*sin θ

ΔY'=ΔL*cos θ wherein ΔL is a length of a line connecting coordinate points before and after deformation of the plurality of monitoring points;

γ is an angle between a positive direction of a y-axis of the unit coordinate system of the plurality of monitoring points and a positive direction of a y-axis of the tunnel measurement coordinate system;

δ is an angle between a coordinate point connection before and after the deformation of the plurality of monitoring points and a negative direction of the y-axis of the tunnel measurement coordinate system;

θ is an angle between the coordinate point connection before and after the deformation of the plurality of monitoring points and the positive direction of the y-axis of the unit coordinate system;

ΔX' is a displacement value in the x-axis direction of the unit coordinate system of the plurality of monitoring points, wherein ΔX' is also a horizontal convergence value of the plurality of monitoring points; meanwhile, a horizontal convergence rate of the monitoring points is $\Delta X/(T_{Qmin}-T_{Qrhn})$, and ΔY' is a displacement value of the y-axis direction of the unit coordinate system of the plurality of monitoring points, wherein ΔY' is also an axial displacement value of the plurality of monitoring points, meanwhile, an axial displacement rate of the monitoring points is $\Delta Y'/(T_{Qmin}-T_{Qrhn})$.

7. The tunnel automatic monitoring and measurement method based on the fixed-point tour measurement according to claim 3, wherein in step s4, according to a cumulative deformation value and deformation rate, a monitoring situation is judged, and the support structure deformation risk criteria, as well as corresponding early warning levels, and automatic emergency measures are pre-formulated in the background processing system for monitoring and early warning;

1) a judgment criteria of cumulative deformation value if the cumulative deformation value of a monitoring point is less than ⅓ of a reserved deformation, it is considered safe and normal monitoring;

if the cumulative deformation value of the monitoring point is between ⅓ and ⅔ of the reserved deformation, a monitoring frequency is automatically doubled, and wireless communication facilities of the tunnel automatic monitoring and measuring equipment are configured to send a reminder signal to a relevant person in charge of the project;

if the cumulative deformation value of the monitoring point is greater than ⅔ of the reserved deformation, the monitoring frequency is automatically tripled, and a risk warning signal is sent to a relevant person in charge of the project through the wireless communication facilities of the tunnel automatic monitoring and measurement equipment;

2) A judgment criteria of deformation rate if the deformation rate of the monitoring point is less than 0.2 mm/d, it is regarded as safe and normal monitoring;

if the deformation rate of the monitoring point is between 0.2 mm/d and 1 mm/d, the monitoring frequency is automatically doubled, and a reminder signal is sent to the relevant person in charge of the project through the wireless communication facilities of the tunnel automatic monitoring and measuring equipment; and if the deformation rate of the monitoring point is greater than 1 mm/d, the monitoring frequency is automatically tripled, and a risk warning signal is sent to the relevant person in charge of the project through the wireless communication facilities of the tunnel automatic monitoring and measuring equipment.

8. The tunnel automatic monitoring and measurement method based on the fixed-point tour measurement according to claim 2, wherein in step s2, the tunnel automatic monitoring and measuring equipment comprises the monitoring trolley allowed to move freely in a longitudinal direction of a tunnel, the plurality of automatic tracking and identification devices are set on the monitoring trolley, and the plurality of automatic tracking and identification devices are connected to a background processing system through a telecommunication; a number of reflective markings used to mark a location of a monitoring point are arranged on a surface of the tunnel support structure, the reflective markings form monitoring sections in a transverse direction of the tunnel and monitoring lines in an axial direction of the tunnel; each of the plurality of automatic tracking and identification devices is relative to a corresponding monitoring line; each of the plurality of automatic tracking and identification devices comprises an intelligent scanning camera and a laser ray head, and each of the plurality of automatic tracking and identification devices is fixed on an arch truss by a fixed frame, wherein the fixed frame is allowed to adjust transverse and vertical deflection angles of the laser ray head;

collecting a tunnel measurement coordinate system and an unit coordinate system of the plurality of monitoring points, the tunnel measurement coordinate system is consistent with a construction control network coordinate system of a project; the unit coordinate system of the plurality of monitoring points takes a tangent line direction of an on-line position of the plurality of monitoring points as a positive direction of a y-axis, and a vertical direction is a z-axis direction, and an x-axis direction is determined according to a right-handed law;

setting a reflective marking on each of the plurality of monitoring points, using each one of the plurality of automatic tracking and identification devices with an intelligent scanning camera to realize an automatic intelligent tracking and recognition of reflective markings, collecting unit coordinate information of relevant monitoring points by a laser point measurement, comprising collecting a longitudinal deflection angle and a transverse deflection angle of a laser ray, the laser ray length, a monitoring time point, automatic tracking and identification device displacement coordinates and tour monitoring number information in a monitoring work.

* * * * *